United States Patent [19]
Hough

[11] Patent Number: 5,143,165
[45] Date of Patent: Sep. 1, 1992

[54] LIQUID WEIGH SYSTEM

[75] Inventor: Richard M. Hough, Lansing, Mich.

[73] Assignee: Hough International, Inc., Albertville, Ala.

[21] Appl. No.: 643,350

[22] Filed: Jan. 22, 1991

[51] Int. Cl.⁵ .................. G01G 13/16; G01G 19/22; B65B 1/30
[52] U.S. Cl. ..................... 177/59; 177/70; 141/83
[58] Field of Search ............ 177/59, 70, 105–113; 141/83

[56] References Cited
U.S. PATENT DOCUMENTS

| | | | |
|---|---|---|---|
| 4,182,383 | 1/1980 | Adomitis et al. | 141/83 X |
| 4,947,089 | 8/1990 | Abel | 177/70 X |
| 5,035,294 | 7/1991 | Volk, Jr. | 177/70 |

Primary Examiner—George H. Miller, Jr.
Attorney, Agent, or Firm—Price, Heneveld, Cooper, DeWitt & Litton

[57] ABSTRACT

A weigh system having a plurality of weigh hoppers in a housing, the hoppers being removably mounted on a suspension support or platen held on load cells outside of the housing. Each hopper has a ball valve at the outlet spout, seated on an O-ring seat and retained with vertical guide rods. A vertical rod extends up from each ball valve to a rotary lift to be actuated when the load cell detects a predetermined load. Beneath these hoppers are surge hoppers to receive the weighed materials. Float ball valves in the surge hoppers actuate a switch to activate a motor to discharge pumps.

20 Claims, 6 Drawing Sheets

LIQUID WEIGH SYSTEM

BACKGROUND OF THE INVENTION

This invention relates to liquid weighing systems for weighing a plurality of liquids for batching.

Weighing of individual liquid components to be added to solid material such as food or animal feed, or to make up an all liquid batch of material such as paint, conventionally requires fairly complex apparatus if the process is to be accurate. It is frequently desirable to be able to change from weighing one group of ingredients to another group, successively, using the apparatus. For example, it may be desired to change from combining materials and additives for beef cattle feed to combining different additives and ingredients for calf feed.

Prior apparatus, to the extend known, basically relies upon volumetric metering of the individual components in efforts to obtain the desired result. Volumetric measurements do not necessarily give the desired weight measurements, however. The result can be inventory drift.

It would be desirable to be able to readily combine components based upon weight characteristics. Moreover, it would be desirable to be able to employ varying size weighing vessels when products of different types are to be sequentially prepared.

Certain components to be combined, e.g., for animal feed, require elevated temperatures. Typical of such ingredients would be fat, to maintain its liquidity. However, applied head can alter the weighing results by affecting the weight sensing mechanism. Another difficulty with apparatus of this type is the problem of keeping the discharge valves clean of residual materials, especially when changing from one product to another.

SUMMARY OF THE INVENTION

One object of this invention, therefore, is to provide a novel liquid weighing system for ingredients to be added to a solid matrix or to be batched into a liquid product. Moreover, selected tanks of varying sizes can be combined and/or substituted on a customized basis to achieve the desired results. Ingredients such as fat can be kept at elevated temperatures for optimum liquidity, yet without affecting the accuracy of the load cells to measure weight values of the ingredients being added. Individual vessels or hoppers can be readily and easily lifted off and replaced by other selected vessel. Each vessel or hopper has a special drain valve arrangement utilizing a ball valve on an O-ring seat. The ball valve can be lifted to open the discharge port by elevating a rod attached to the ball and extending upwardly therefrom. The weighed ingredients are discharged into one or more underlying surge hoppers to be emptied by one or more pumps operated by the same motor. The surge tanks have ball valves which float to operate an electrical switch to activate and deactivate the pump or pumps which drain the surge tanks.

These and several other objects, advantages and features of the present invention will become apparent upon studying the following detailed specification in conjunction with the drawings.

DESCRIPTION OF THE PREFERRED EMBODIMENT

Figure 1:
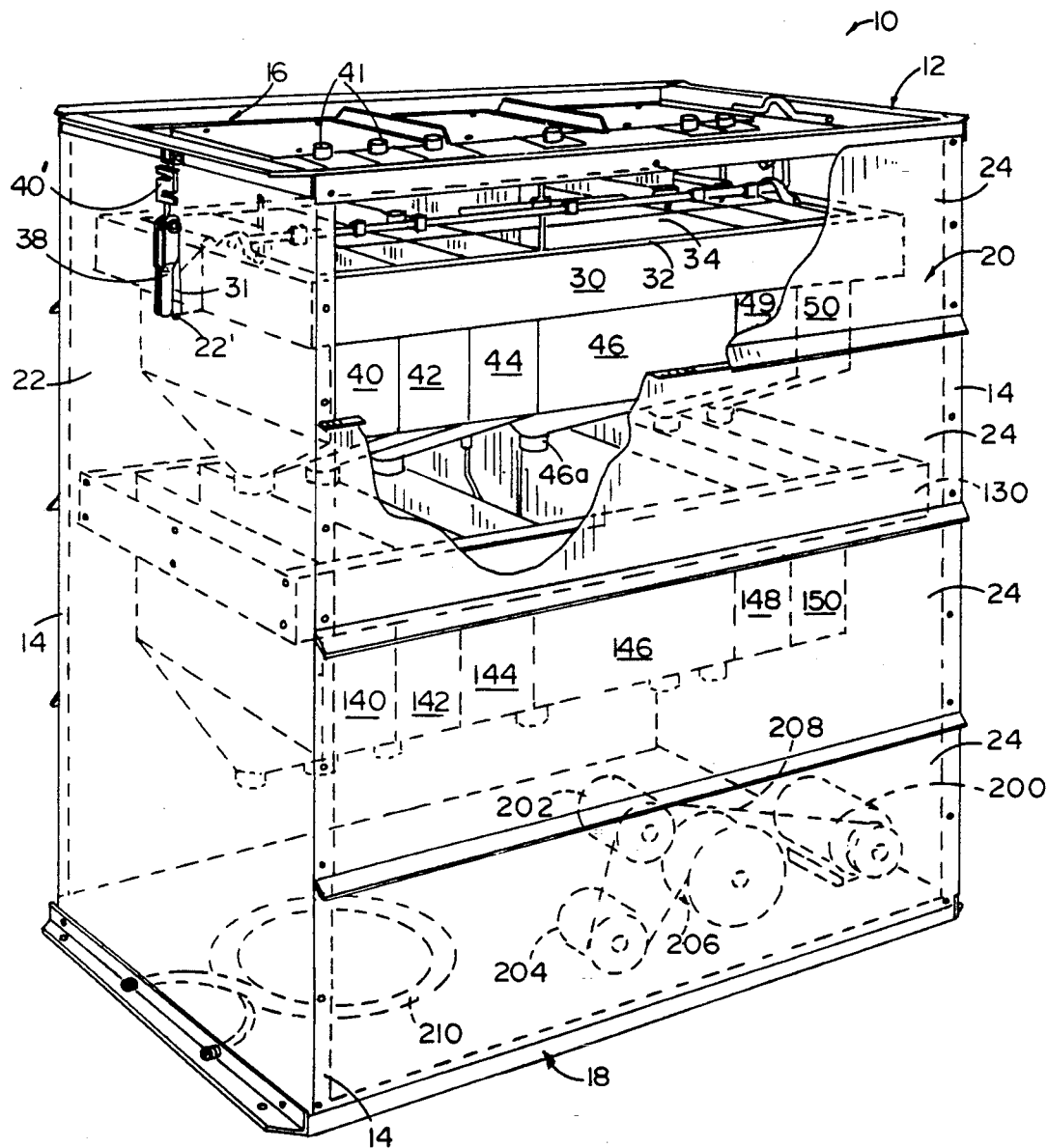
FIG. 1 is a perspective view of a preferred form of the novel apparatus.

Referring now specifically to the drawings, the assembly 10 includes a framework 12 and a housing 20 to support and enclose the apparatus. These components and the apparatus therein are preferably made of stainless steel. Framework 12 is shown to include a plurality of four upright supports 14 interconnected at the tops and bottoms thereof by rectangular frames 16 and 18, each composed of four lengths of angle iron interconnected to uprights 14 and each other at their ends. This framework is enclosed by housing 20 which may be composed of two elongated end panels 22 and a plurality of side panels 24 arranged one above the other and overlapping each other.

Within the upper part of the housing is suspended a rectangular suspension platen or support 30 which may be formed, for example, of four interconnected channel iron pieces defining an upper peripheral ledge 32 and a central space 34. Secured to and extending from the two opposite ends of platen 30 is a pair of supports 31 which protrude through openings 22' in housing panels 22. These rest on brackets 38 pivotally attached to a pair of load cells 40' which serve as weight sensors which are mounted to framework 16 thereabove. Thus, the load cells, brackets and platen are suspended from framework 16, with the load cells being outside of housing 20 while the platen and any weigh hoppers thereon are inside housing 20.

Figure 2:
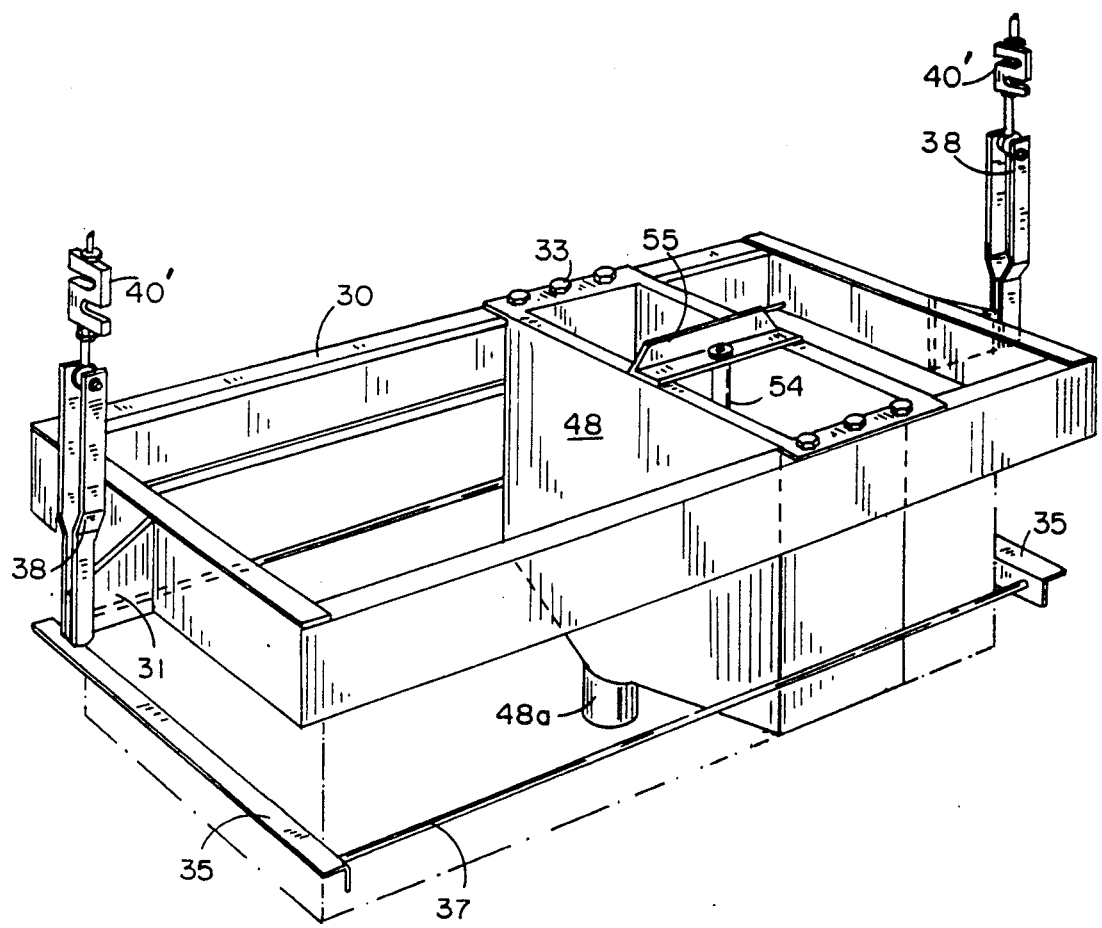
FIG. 2 is a fragmentary perspective view of the upper portion of the apparatus in FIG. 1.

Suspended from carriage 30 is a plurality of weighing vessels in the form of a plurality of hoppers 40, 42, 44, 46, 48 and 50 arranged side by side. These hoppers, here six in number, have end flanges which extend over the opposite sides of ledge 32 of platen 30 at opposite ends of each hopper, to be supported on the platen. These hoppers are preferably bolted to platen 30 by bolts 33 (FIG. 2). The hoppers are of selected size for the particular product. They can be readily substituted by other hoppers of different sizes simply by unbolting them, lifting them off platen 30 and replacing them with other hoppers. The hoppers are preferably held securely together by end plates 35 secured by tie rods 37. Ingredients can be introduced into the weigh hoppers through suitable inlets 41 (FIG. 1) at the top of the housing.

Figure 6:
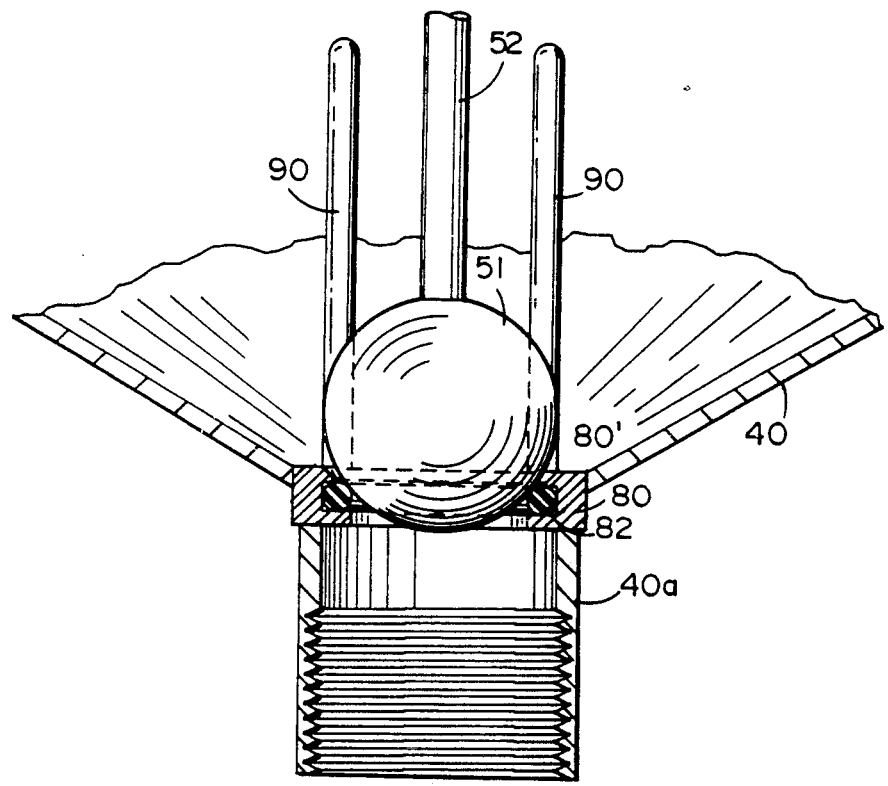
FIG. 6 is an enlarged, sectional, elevational, fragmentary view of the valve and valve seat in the apparatus in FIGS. 4 and 5, with the valve closed.
Figure 7:
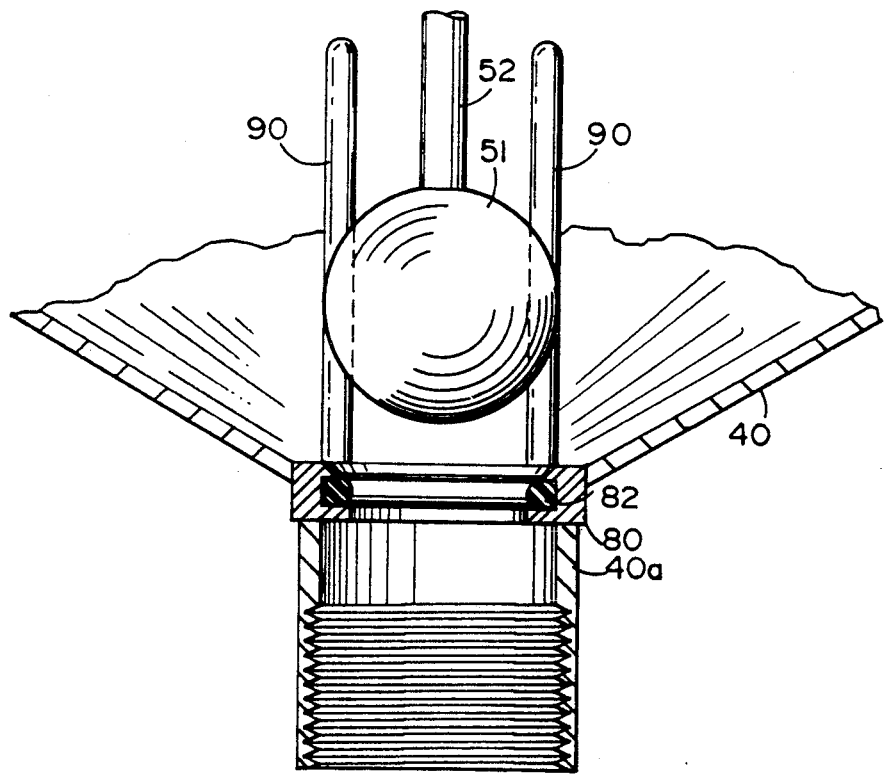
FIG. 7 is a fragmentary, enlarged, sectional, elevational view comparable to FIG. 6, with the valve open.

The bottom of each hopper is truncated, terminating in a central lower discharge outlet spout, e.g., 46A (FIG. 1) or 48A (FIG. 2). Each hopper outlet, e.g., outlet 40a of hopper 40 (FIG. 3), has a valve seat and a ball valve for controlling discharge therefrom. The position and function of the valve and seat are shown in FIGS. 4–7. Specifically, valve 51 is a ball valve of suitable material such as stainless steel, capable of being elevated from a lower seated position (FIG. 6) to an elevated discharge position (FIG. 7). Extending upwardly from ball valve 51 is a rod 52 connected at its lower end to the ball valve and extending through a guide sleeve 54 toward the upper end. Sleeve 54 is supported on a bracket 55 on the top of the hopper (FIG. 2). Rod 52 extends above the sleeve, this upper extended portion (FIG. 4) having a follower or cam follower 56 attached thereto as by set screws. Abutting the lower curved surface of follower 56 is the distal end of a pivotal lever 58 having its opposite fixed end mounted to a rotational pivot shaft 60. An arm 62 is fixed at one of its ends to pivot shaft 60 and pivotally connected at its opposite upper end to link 64 attached to the extended end of piston rod 66 extending from fluid cylinder 68. The opposite end of cylinder 68 is pivotally attached at 70 to a fixed mount 72 secured to the framework of the apparatus. Pivot rod 60 has a series of levers like 58 attached thereto, one for each valve for each respective hopper. This mechanism constitutes an elevator means. In the lowered position of valve 51, the valve engages a special valve seat (FIGS. 6 and 7). The valve seat has a peripheral base 80 defining an annular groove 80' which contains a removable O-ring 82 of a soft, resilient, inert polymeric material such as "Teflon" or the like. Base 80 is recessed at the upper inner corner thereof so that O-ring 82 will be readily engaged by the lower hemisphere of ball valve 51, to seal off the outlet spout, e.g., 40a of hopper 40. Raising of ball valve 51 is guided by a plurality of four laterally spaced, parallel, vertically extending guide rods 90 around the ball, to maintain the ball valve vertically aligned with the valve seat. The valve seat simplicity prevents serious hang-up of ingredients thereat. It is readily replaceable simply by removing the O-ring 82 and inserting another one. The valves are raised by actuation of fluid cylinder 68 (FIG. 5) which extends piston rod 66 to pivot arm 62 and thereby pivot shaft 60, raising levers 58 to elevate cam follower 56 and the other cam followers, and thus rod 52 and the other rods, and ball valve 51 and the other ball valves. The contents of the several weighing hoppers are thus released to discharge to the surge hoppers therebelow, and to be described hereinafter. This discharge occurs on a planned basis after the correct weight of ingredients is detected by load cells 40'. This discharge may be automatic upon the load cells detecting a predetermined load, or can be manually activated when the load cells indicate on a conventional gauge (not shown) that the desired load has been reached.

Figure 3:
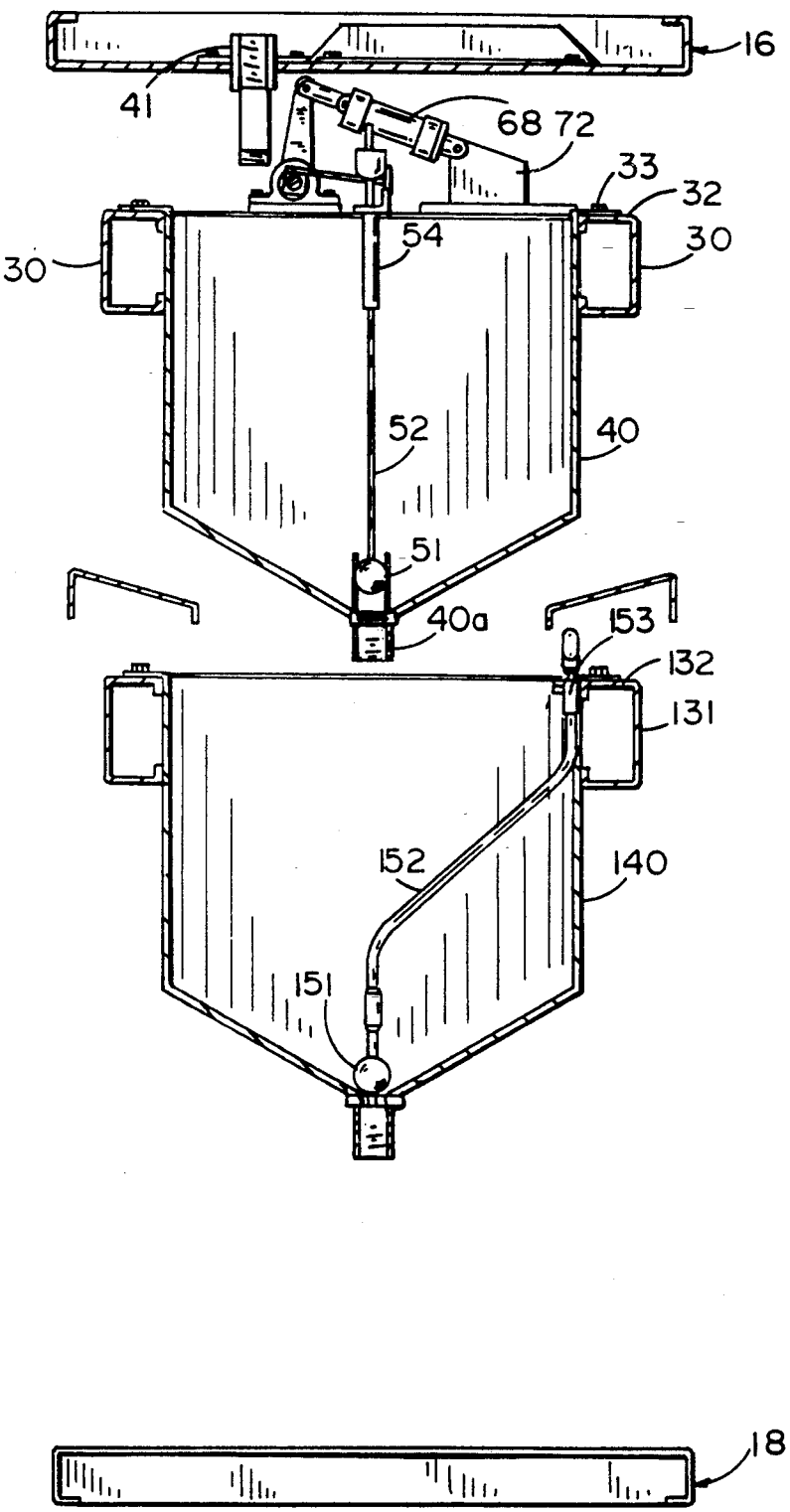
FIG. 3 is an exploded, sectional, elevational view of the apparatus in FIG. 1.
Figure 4:
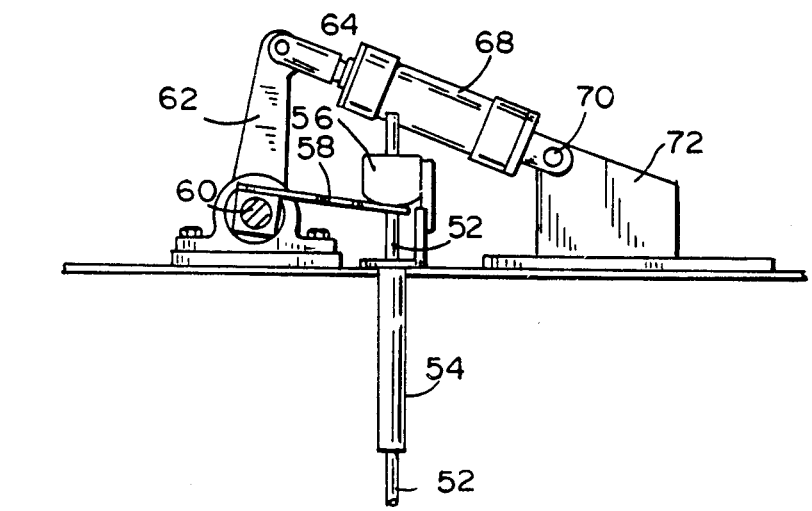
FIG. 4 is a fragmentary, sectional, elevational view of the portion of the apparatus in FIGS. 1 and 2, showing the discharge valve closed.
Figure 4:
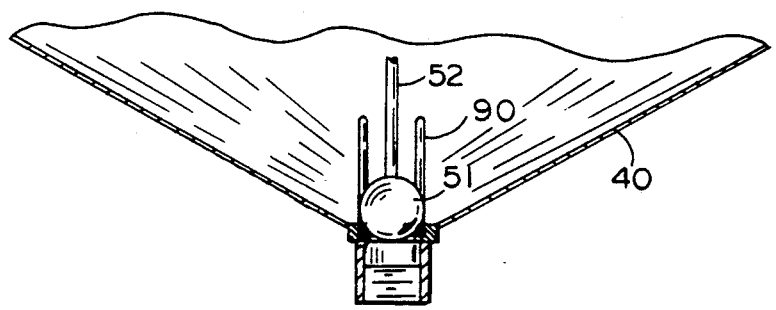
Figure 5:
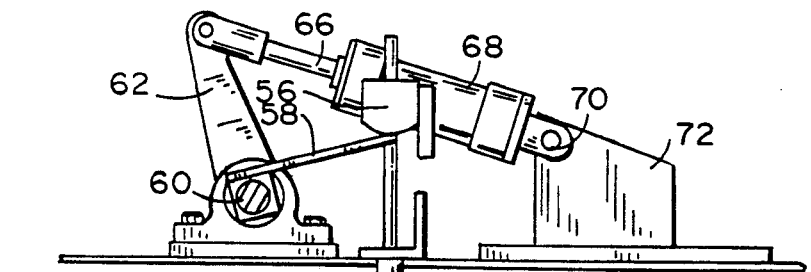
FIG. 5 is a fragmentary, sectional, elevational view comparable to FIG. 4, with the valve open.
Figure 5:
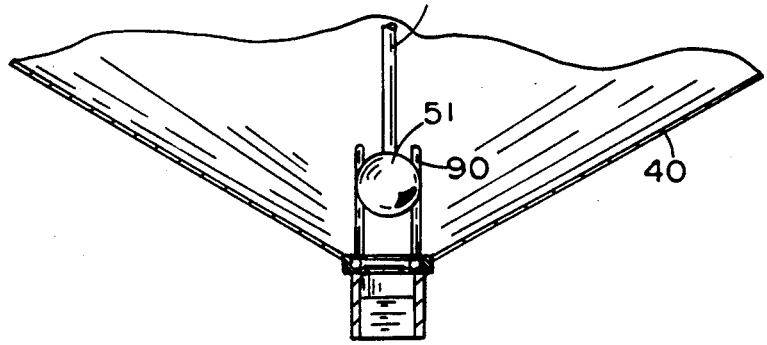
Figure 8:
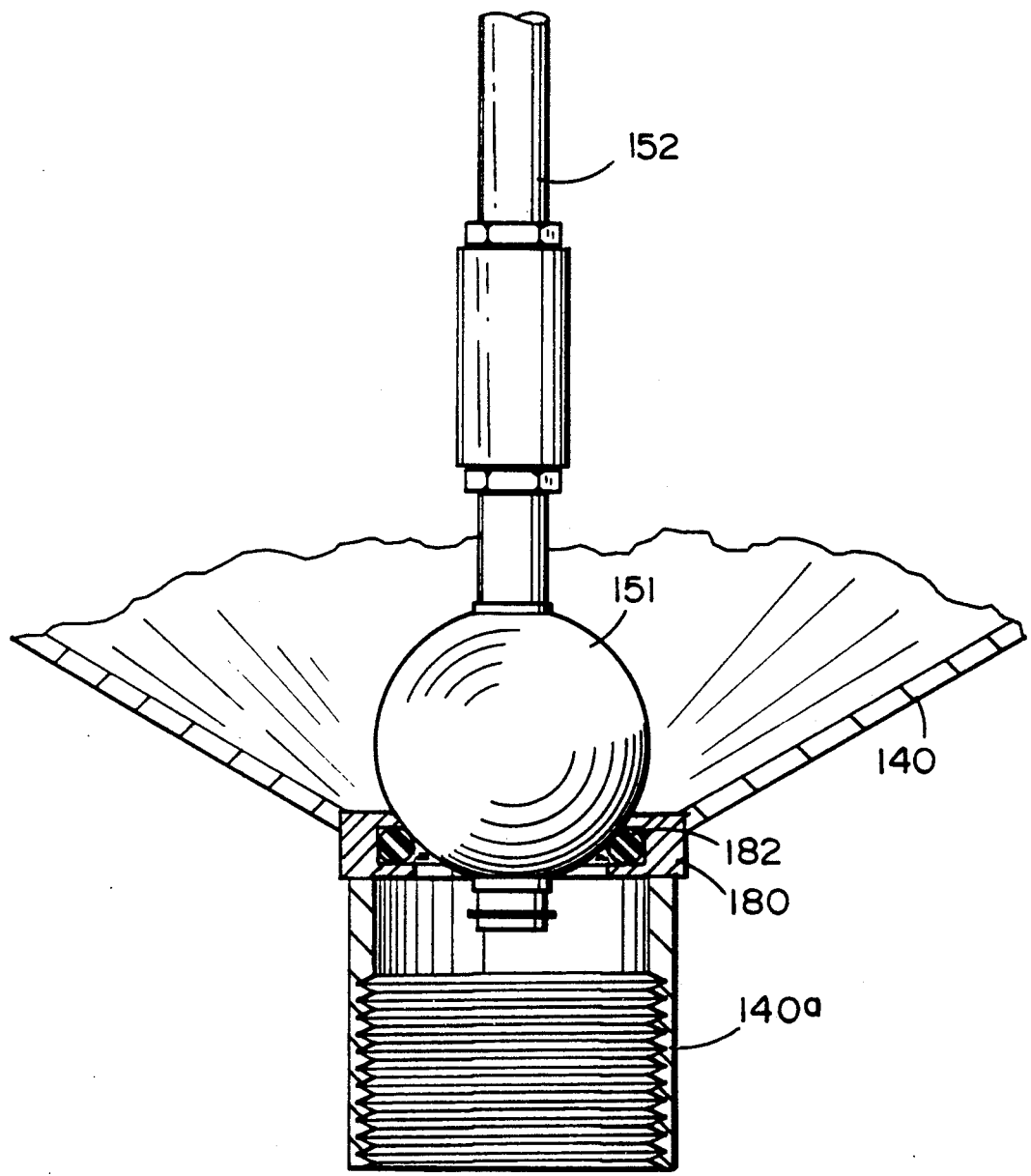
FIG. 8 is a fragmentary enlarged sectional view of a portion of one of the lower surge vessels or hoppers of the apparatus.

Directly beneath the plurality of weigh hoppers is shown a plurality of surge hoppers 140, 142, 144, 146, 148 and 150. Alternatively, there may be one large surge hopper beneath all the weigh hoppers for mixing all of the ingredients together, or any other number of surge hoppers for mixing various of the ingredients, as necessary. These surge hoppers are mounted on a rectangular support 130 by having a pair of end flanges resting on, and preferably fastened by bolts to, the upper surface 132 thereof. Support 130 is fixed by attachment to framework 12 and housing 20. The surge hoppers each have a float ball valve, e.g., float ball valve 151 (FIGS. 3 and 8) in surge hopper 140. This ball valve cooperates with a valve seat comparable to the one in the weigh hoppers, i.e., including an O-ring 182 mounted in the inner groove of frame 180 which is diagonally cut away on the inner periphery so as to expose O-ring 182 for sealing engagement with the lower hemisphere of ball valve 151. Extending up from ball valve 151 is a rod 152 which preferably extends diagonally to and up along the side wall of the hopper where the upper end of it cooperates with an on-off limit switch 153 (FIG. 3). This switch controls electric drive motor 200 (FIG. 1) which drives one or more pumps, here shown to be three in number as 202, 204 and 206, via an endless drive, e.g., a V-belt 208 or the equivalent. These individual pumps are connected by conduits (not shown) to the surge hopper discharge outlets, e.g., 140a (FIG. 8), to pump the contents to a desired final location.

Also located within housing 20 at the base thereof is an electrical or other type heating element 210 (FIG. 1) for supplying heat to the environment within the housing, e.g., to maintain materials in a liquid condition. However, load cells 40' are outside of the housing, as previously noted, to prevent the elevated temperatures from affecting their accuracy.

In use of the apparatus, e.g., to prepare a cattle feed by incorporating additives into the feed, several ingredients are introduced into the weigh hoppers, e.g., fat into large hopper 46 and other ingredients such a choline chloride, antioxidant, molasses, and methionine, are introduced into the other weigh hoppers until the desired total is detected by the load cells. At that time, fluid cylinder 68 is activated to raise the rods, e.g. 52, connected to the valves, e.g., 51, causing the contents to discharge into the surge hopper or hoppers. As the fluid level rises in the surge hoppers, float valves, e.g., 151, are elevated, activating motor 200 for the pumps to discharge the contents from the surge hoppers to the desired final location, e.g., in a mixing bin with a solid feed component. If the next process to be performed requires a different size or different number of hoppers, hoppers can be readily removed and replaced.

The apparatus could alternatively be used for blending a batch of liquid components, e.g., paint or other materials.

It is conceivable that the specific preferred embodiment depicted and illustrated as exemplary could be modified in various ways to suit the particular use or uses of the apparatus. Hence, the invention is not intended to be limited to the specific preferred embodiment depicted and explained in detail, but only by the scope of the appended claims and the reasonably equivalent structures to those defined therein.

The embodiments of the invention in which an exclusive property or privilege is claimed are defined as follows.

1. A weigh system comprising:
   a plurality of hoppers for receiving materials to be weighed;
   a discharge outlet for each said hopper, and valve means for each said discharge outlet;
   a suspension support for said hoppers, each said hopper being suspended from said support;
   a frame;
   load cells supporting said suspension support from said frame for indicating total weight load in all of said hoppers; and
   means for actuating all of said valve means to discharge said hoppers when a predetermined total weight is reached.

2. The weigh system in claim 1 wherein said hoppers are removably suspended from said suspension support for potential removal and/or replacement of individual hoppers.

3. A weigh system comprising:
hoppers for receiving materials to be weighed;
a discharge outlet for each said hopper, and valve means for each said discharge outlet;
a suspension support for said hoppers, each said hopper being suspended from said support;
a frame;
load cells supporting said suspension support from said frame for indicating weight load in said hoppers;
said hoppers being removably suspended from said suspension support for potential removal and/or replacement of individual hoppers; and
said valve mans comprising a ball valve, and including an annular valve seat beneath said ball valve.

4. The weigh system in claim 3 wherein said valve seat comprises a resilient O-ring.

5. The weigh system in claim 4 including an O-ring support defining an annular groove retaining said O-ring.

6. The weigh system in claim 3 including actuator means for raising said ball valve, said actuator means comprising a lift element attached to and extending up from said ball valve, and elevator means in operative relationship with said lift element for raising said lift element and said ball valve from said valve seat.

7. The weigh system in claim 6 wherein said elevator means includes a follower on said lift element, a pivot lever engageable with said follower to lift it, and a pivot rod mounting said pivot lever.

8. The weigh system in claim 3 wherein said hopper has a plurality of vertical rods spaced from each other about the periphery of said ball valve to guide said ball valve vertically.

9. The weigh system in claim 7 including a power actuator connected to said pivot rod.

10. A weigh system comprising:
a plurality of weighing vessels comprising hoppers for receiving materials to be weighed;
a discharge outlet for each said hopper, and valve means for said discharge outlet;
said valve means comprising a ball valve, and including an annular valve seat beneath said ball valve;
a suspension support for each said hopper, each said hopper being suspended from said support;
a frame; and
load cells supporting said suspension support from said frame for indicating weight load in said hoppers.

11. The weigh system in claim 10 wherein said valve seat comprises a resilient O-ring.

12. The weigh system in claim 11 including an O-ring support-defining an annular groove containing said O-ring; and
actuator means for raising said ball valve, said actuator means comprising a lift rod attached to and extending up from said ball valve, and elevator means in operative relationship with said lift rod for raising said lift rod and said ball valve from said valve seat.

13. The weigh system in claim 12 wherein said elevator means includes a follower on said lift rod, a pivot lever engageable with said follower to lift it, and a pivot rod mounting said pivot lever.

14. The weigh system in claim 10 wherein each said hopper has a plurality of vertical rods spaced from each other about the periphery of said ball valve to guide said ball valve vertically.

15. A weighing and batching system comprising:
a suspended hopper support platen;
aweigh hoppers on said platen for receiving materials to be weighed, each weigh hopper having a discharge outlet;
a framework;
weigh sensors;
said support platen being suspended from said framework by said weigh sensors;
valve means in each of said weigh hoppers at said discharge outlet;
means associated with each said valve means for shifting said valve means to open said discharge outlets;
surge hoppers beneath said weigh hoppers for receiving material discharged from said weigh hoppers, and having a discharge opening;
valve means for each said discharge opening;
pump means associated with said discharge openings; and
motor means operably connected to said pump means to operate said pump means and thereby remove contents from said surge hoppers.

16. The system in claim 15 wherein:
said weigh hoppers are removable from said support platen for replacement by other hoppers;
said valve means comprises a ball valve in each said weigh hopper, elevatable for opening said discharge outlet;
said ball valve having a rod extending upwardly therefrom for elevation of said ball;
said valve shifting means comprising elevating means; and
said ball valve and rod being removable with said weigh hopper.

17. The system in claim 16 including an O-ring valve seat below each said ball valve, and vertical guides around each said ball valve to keep said ball valve vertically aligned with said O-ring valve seat.

18. The system in claim 17 wherein:
said valve seat includes a base defining an annular groove for retaining said O-ring, said base being recessed at the upper inner corner thereof to enable the lower hemisphere of said ball valve to sealingly engage said O-ring seat.

19. The system in claim 16 wherein:
said valve elevating means comprises a fluid actuator, a pivot shaft, and elevating levers on said pivot shaft, operably associated with said vertical rod.

20. The system in claim 15 wherein said pump means comprises a plurality of pumps;
said surge hopper valve means comprises a float valve in each said surge hopper; and
switch means operable by said float valve and operably connected to said pumps to activate said pumps.

* * * * *

UNITED STATES PATENT AND TRADEMARK OFFICE
CERTIFICATE OF CORRECTION

PATENT NO. : 5,143,165

DATED : September 1, 1992

INVENTOR(S) : Richard M. Hough

It is certified that error appears in the above-identified patent and that said Letters Patent is hereby corrected as shown below:

Column 1, Line 17:

"extend" should be --extent--;

Column 1, Line 31:

"head" should be --heat--;

Column 1, Line 49:

"selected vessel" should be --selected vessels--;

Column 4, Line 26:

"large hopper" should be --larger hopper--;

Column 5, Line 18:

"valve mans" should be --valve means--;

UNITED STATES PATENT AND TRADEMARK OFFICE
CERTIFICATE OF CORRECTION

PATENT NO. : 5,143,165

DATED : September 1, 1992

INVENTOR(S) : Richard M. Hough

It is certified that error appears in the above-identified patent and that said Letters Patent is hereby corrected as shown below:

Column 6, Line 11:

"aweigh" should be --weigh--.

Signed and Sealed this

Second Day of November, 1993

Attest:

BRUCE LEHMAN

Attesting Officer

Commissioner of Patents and Trademarks